(12) United States Patent
Xing et al.

(10) Patent No.: US 11,561,698 B2
(45) Date of Patent: Jan. 24, 2023

(54) NVMEOF FLOW CONTROL FROM INITIATOR BASED ON TRANSACTION LATENCY

(71) Applicant: EMC IP HOLDING COMPANY LLC, Hopkinton, MA (US)

(72) Inventors: Jinxian Xing, Hopkinton, MA (US); Julie Zhivich, Westborough, MA (US); John Krasner, Coventry, RI (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/234,847

(22) Filed: Apr. 20, 2021

(65) Prior Publication Data

US 2022/0334727 A1  Oct. 20, 2022

(51) Int. Cl.
| | |
|---|---|
| G06F 12/00 | (2006.01) |
| G06F 13/00 | (2006.01) |
| G06F 13/28 | (2006.01) |
| G06F 3/06 | (2006.01) |
| G06F 15/173 | (2006.01) |

(52) U.S. Cl.
CPC ............ *G06F 3/0611* (2013.01); *G06F 3/067* (2013.01); *G06F 3/0614* (2013.01); *G06F 3/0653* (2013.01); *G06F 3/0659* (2013.01); *G06F 15/17331* (2013.01)

(58) Field of Classification Search
CPC ..... G06F 3/0611; G06F 3/0619; G06F 3/0659
USPC ........................................................ 711/154
See application file for complete search history.

(56) References Cited

U.S. PATENT DOCUMENTS

| | | | |
|---|---|---|---|
| 7,631,144 B1 * | 12/2009 | Zhu | G06F 11/1453 711/162 |
| 9,910,753 B1 * | 3/2018 | Tringale | G06F 3/0607 |
| 10,102,308 B1 * | 10/2018 | Parameswaran | G06F 16/245 |
| 10,997,080 B1 * | 5/2021 | Eliash | G06F 12/0871 |
| 11,157,204 B2 * | 10/2021 | Ananthapalli | G06F 3/0689 |
| 11,275,509 B1 * | 3/2022 | Colgrove | G06F 11/1076 |
| 2008/0016286 A1 * | 1/2008 | Temple | G06F 12/0815 711/E12.075 |
| 2008/0037420 A1 * | 2/2008 | Tang | H04L 1/1854 370/231 |
| 2015/0339664 A1 * | 11/2015 | Wong | G06Q 20/4015 705/71 |
| 2016/0378470 A1 * | 12/2016 | Yasin | G06F 9/3836 712/226 |
| 2018/0024743 A1 * | 1/2018 | Herman | G06F 3/0659 710/316 |
| 2018/0098083 A1 * | 4/2018 | McAllister | H04N 19/103 |
| 2019/0369904 A1 * | 12/2019 | Imamura | G06F 3/061 |
| 2019/0372866 A1 * | 12/2019 | Ganguli | H04L 12/4625 |

(Continued)

*Primary Examiner* — Mohamed M Gebril
(74) *Attorney, Agent, or Firm* — Anderson Gorecki LLP

(57) ABSTRACT

A storage array that uses NVMEoF to interconnect compute nodes with NVME SSDs via a fabric and NVME offload engines implements flow control based on transaction latency. Transaction latency is the elapsed time between the send side completion message and receive side completion message for a single transaction. Counts of total transactions and over-latency-limit transactions are accumulated over a time interval. If the over limit rate exceeds a threshold, then the maximum allowed number of enqueued pending transactions is reduced. The maximum allowed number of enqueued pending transactions is periodically restored to a default value.

18 Claims, 4 Drawing Sheets

(56) References Cited

U.S. PATENT DOCUMENTS

| | | | |
|---|---|---|---|
| 2020/0089648 A1* | 3/2020 | Klein | G06F 3/0607 |
| 2020/0159581 A1* | 5/2020 | Mirza | G06F 9/3873 |
| 2020/0233606 A1* | 7/2020 | Duan | G06F 3/0625 |
| 2021/0026540 A1* | 1/2021 | Lai | G06F 12/14 |
| 2022/0019995 A1* | 1/2022 | Ngo | G06Q 20/385 |

\* cited by examiner

NVMEOF FLOW CONTROL FROM INITIATOR BASED ON TRANSACTION LATENCY

TECHNICAL FIELD

The subject matter of this disclosure is generally related to electronic data storage systems, and more particularly to flow control between NVME initiators and targets over a fabric.

BACKGROUND

High-capacity data storage systems such as storage area networks (SANs) and storage arrays are used to maintain large storage objects and contemporaneously support multiple host servers. A storage array includes a network of specialized, interconnected compute nodes that manage access to host application data that is stored on arrays of drives. The compute nodes respond to input-output (IO) commands from host applications running on the host servers. Examples of host applications may include, but are not limited to, software for email, accounting, manufacturing, inventory control, and a wide variety of other business processes.

SUMMARY

Some aspects of the present invention are predicated in part on recognition of a problem created by recent improvements in storage array design. Current state-of-the-art storage arrays use non-volatile memory express over fabric (NVMEoF) to interconnect compute nodes with NVME solid state drives (SSDs). NVMe is a protocol that facilitates accessing SSDs via remote direct memory access (RDMA) protocols. Those RDMA protocols may include end-to-end credit-based flow control. However, storage array architectures that include NVMEoF offload engines may remain vulnerable to internal IO traffic congestion because end-to-end flow control techniques fail to account for usage of NVMEoF offload engine resources such as cache. For example, end-to-end flow control may indicate that the SSDs are ready to receive IOs but the memory resources of an NVMEoF offload engine may be fully utilized so additional IOs from the compute nodes cannot be processed by the NVMEoF offload engine.

In accordance with some implementations a method is implemented in a storage array with a plurality of non-volatile solid-state drives and a plurality of interconnected compute nodes that access the drives via a fabric and offload engines using a remote direct memory access (RDMA) protocol, the method comprising: monitoring transactions between ones of the compute nodes and ones of the offload engines to determine transaction latency; and adjusting a number of pending transactions based on the transaction latency.

In accordance with some implementations an apparatus comprises: a plurality of non-volatile solid-state drives; a plurality of interconnected compute nodes that access the drives via a fabric and ones of a plurality of offload engines; and a flow controller configured to monitor transactions between ones of the compute nodes and ones of the offload engines to determine transaction latency and adjust a number of pending transactions based on the transaction latency, wherein transaction latency indicates time between send side completion and receive side completion based on messages sent by ones of the offload engines.

In accordance with some implementations, a non-transitory computer-readable storage medium stores instructions that when executed by a compute node of a storage array cause the compute node to perform a method for flow control, the method comprising: monitoring transactions between the compute node and at least one offload engine via which non-volatile drives are accessed to determine transaction latency; and adjusting a number of pending transactions based on the transaction latency.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile electronic storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic," if used herein, refers to special purpose physical circuit elements, firmware, software, computer instructions that are stored on a non-transitory computer-readable medium and implemented by multipurpose tangible processors, alone or in any combination. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure. Further, all examples, aspects and features mentioned in this document can be combined in any technically possible way.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
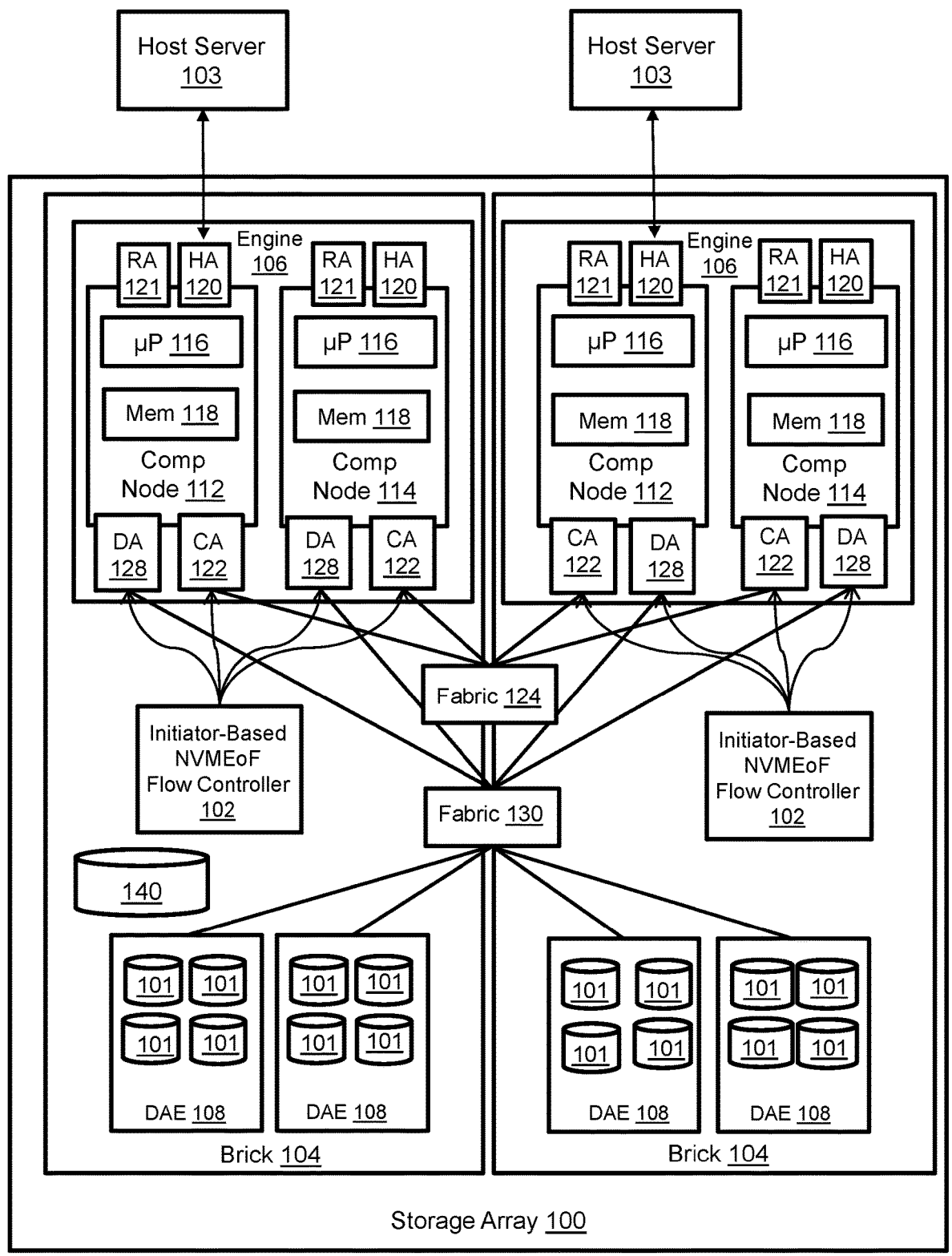
FIG. 1 illustrates a storage array with initiator-based NVMEoF flow control.

FIG. 1 illustrates a storage array 100 with initiator-based NVMEoF flow controller 102. The storage array 100 is depicted in a simplified data center environment supporting two host servers 103 that run host applications. However, there would typically be more than two host servers. The host servers 103 may be implemented as individual physical computing devices, virtual machines running on the same hardware platform under control of a hypervisor, or in containers on the same hardware platform. The storage array 100 includes one or more bricks 104. Each brick includes an engine 106 and one or more drive array enclosures (DAEs) 108. Each engine 106 includes a pair of interconnected compute nodes 112, 114 that are arranged in a failover relationship. The compute nodes may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g., on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the host servers 103. Each host adapter has resources for servicing input-output commands (IOs) from the host servers. The HA resources may include processors, volatile memory, and ports via which the host servers may access the storage array. Each compute node also includes a remote adapter (RA) 121 for communicating with other storage systems. Each compute node also includes one or more drive adapters (DAs) 128 for communicating with managed drives 101 in the DAEs 108. Each DA has processors, volatile memory, and ports via which the compute node may access the DAEs for servicing IOs. Each compute node may also include one or more channel adapters (CAs) 122 for communicating with other compute nodes via an interconnecting fabric 124. Initiator-based NVMEoF flow controllers 102 are implemented by the DAs and CAs.

The managed drives 101 are non-volatile electronic data storage media such as, without limitation, NVME SSDs based on electrically erasable programmable read-only memory (EEPROM) technology such as NAND and NOR flash memory. Drive controllers may be associated with the managed drives as is known in the art. An interconnecting fabric 130 enables implementation of an N-way active-active back end. A back-end connection group includes all drive adapters that can access the same drive or drives. In some implementations every DA 128 in the storage array can reach every DAE via the fabric 130. Further, in some implementations every DA in the storage array can access every managed drive 101.

Data associated with instances of a host application running on the hosts 103 is maintained on the managed drives 101. The managed drives 101 are not discoverable by the hosts 103 but the compute nodes 112, 114 create storage objects that can be discovered and accessed by the hosts. The storage objects that can be discovered by the hosts are sometimes referred to as production volumes, and may alternatively be referred to as source devices, production devices, or production LUNs, where the logical unit number (LUN) is a number used to identify logical storage volumes in accordance with the small computer system interface (SCSI) protocol. From the perspective of the hosts 103, a production volume 140 is a single drive having a set of contiguous LBAs at which front-end tracks (FE TRKs) of data used by the instances of the host application reside. However, the host application data is stored at non-contiguous addresses, possibly on multiple managed drives 101, e.g., at ranges of addresses distributed on multiple drives or multiple ranges of addresses on one drive. The compute nodes maintain metadata that maps between the production volumes and the managed drives 101 in order to process IO commands from the hosts using storage array-internal IO commands from the compute nodes to the managed drives. In other words, the compute nodes and managed drives are the endpoints of the internal IOs, with the compute nodes being the initiators and the managed drives being the targets. The initiator-based NVMEoF flow controller 102 facilitates processing of the internal IOs by mitigating traffic congestion.

Figure 2:
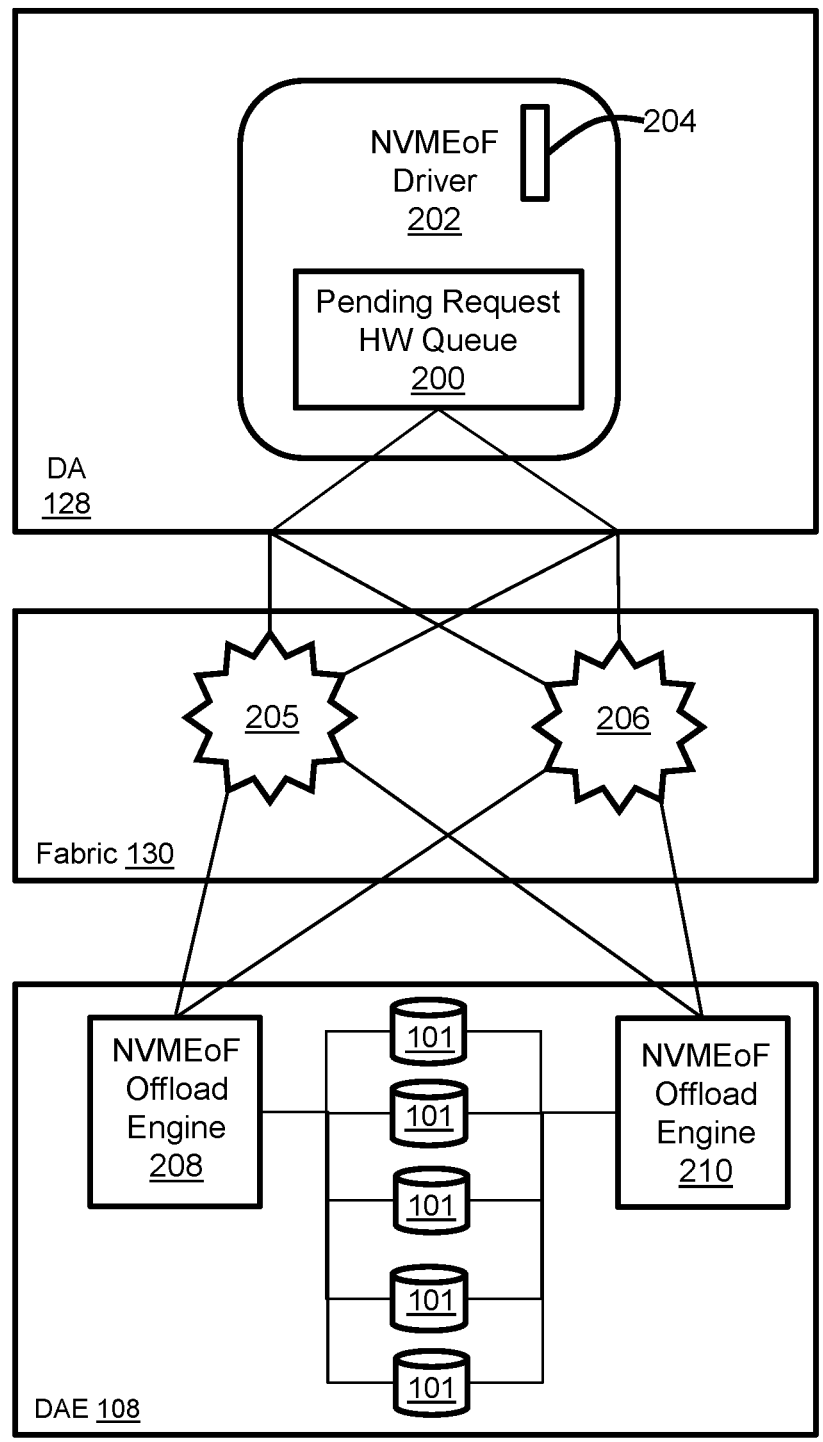
FIG. 2 illustrates the drive adapter, fabric, and disk array enclosure in greater detail.

FIG. 2 illustrates the DA 128, fabric 130, and DAE 108 in greater detail. The DA 128 includes a hardware queue 200 in volatile memory. Request pointers for internal IOs generated by the compute nodes are enqueued in the hardware queue 200 by an NVMEoF driver 202. The NVMEoF driver includes a software queue 204 for internal IOs that cannot be enqueued in the hardware queue 200, e.g., due to the fullness (depth) of the pending request hardware queue. The fabric 130 has a double-star architecture with redundant fabric elements 205, 206 that provide initiator-to-target connectivity via redundant paths. The DAE 108 includes two NVMEoF offload engines 208, 210. Both of the NVMEoF offload engines are connected to all of the managed drives 101 of the DAE. The fabric 130 provides each of two ports of the DA 128 with connectivity to each of the NVMEoF offload engines. The NVMEoF offload engines 208, 210 can exchange data and commands with the DA using RDMA. The NVMEoF offload engines can be configured to perform various processor-intensive services such as error correction and deduplication. After an IO is submitted to fabric hardware, the corresponding request information is saved to the hardware queue 200. IOs for which request information is enqueued in the pending request hardware queue are the IOs currently being processed currently by an NVMEoF offload engine. Concurrent IOs are submitted to hardware until the total count reaches pending queue limit, and any excess requests are placed into the software pending queue. IOs associated with requests that are enqueued in the pending request hardware queue 200 are eventually transported via the fabric 130 to one of the NVMEoF offload engines 208, 210 and IO data is placed in offload engine cache using RDMA. Responses are transported via the fabric to the DA and data placed in cache using RDMA. More specifically, once the command lands on the DAE side, an offload engine initiates data transfer to the DA using RDMA via the fabric. As previously mentioned, utilization of processor and memory resources of the NVMEoF offload engines is not indicated by current end-to-end RDMA flow control techniques.

Figure 3:
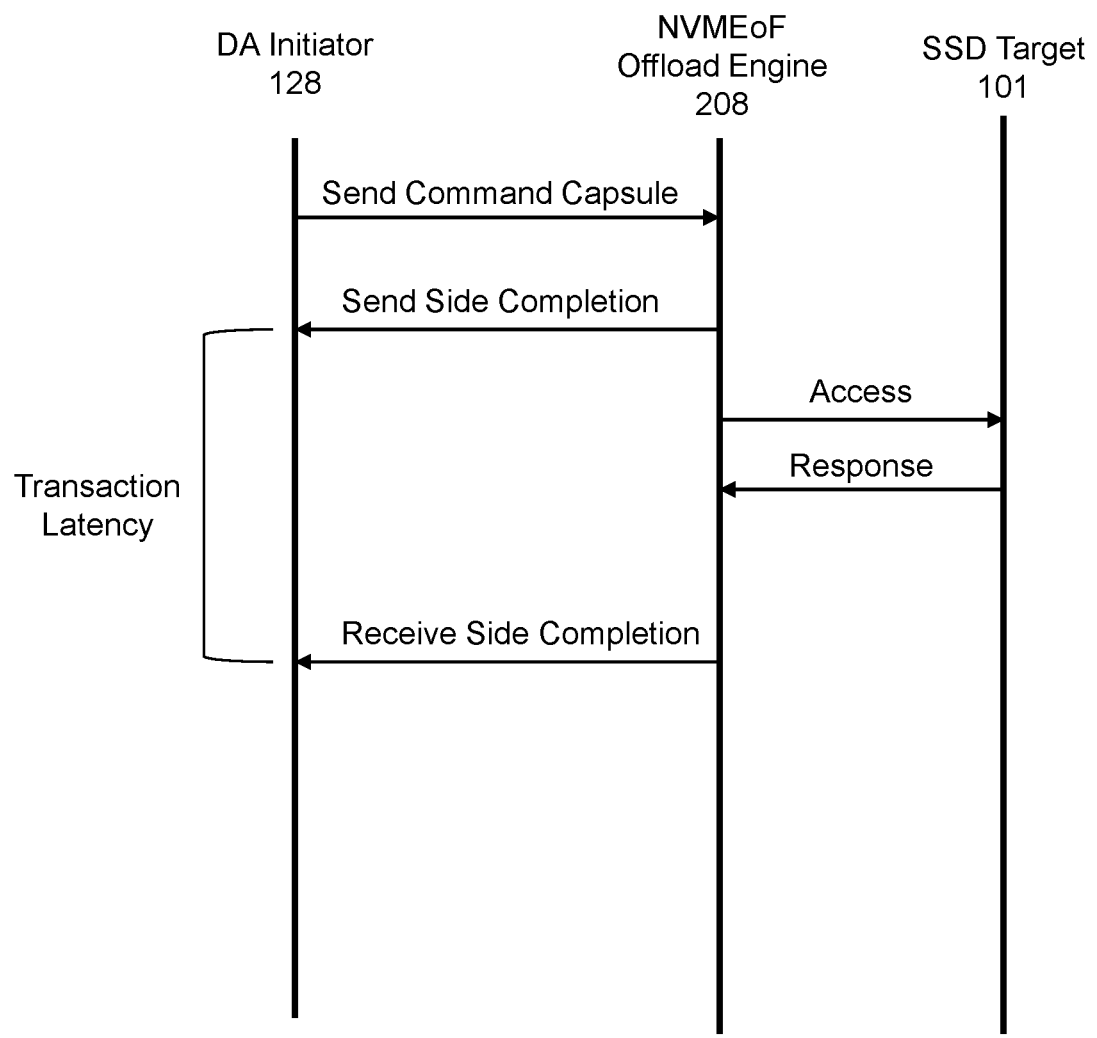
FIG. 3 illustrates transaction latency.

FIG. 3 illustrates transaction latency. A transaction commences when a DA initiator 128 sends a command capsule to an NVMEoF offload engine 208 via the fabric. The command capsule includes a data access command, e.g., to read or write data from or to an NVME SSD target 101. The NVMEoF offload engine responds by sending a capsule with a send side completion message to the DA via the fabric. The send side completion message is an acknowledgement of receipt of the command capsule. The NVMEoF offload engine accesses the drive target, which provides a response.

The NVMEoF offload engine sends a capsule with a receive side completion message to the DA via the fabric when the target access and response have been completed. The amount of time used by the NVMEoF offload engine to process the data access command, i.e., the transaction latency, is indicated by the elapsed time between the send side completion and the receive side completion, which can be determined based on message timestamps and/or timestamps created by the DA initiator upon message receipt. As will be explained below, the DA may implement flow control based on changes in transaction latency by adjusting a depth limit of the pending request hardware queue 200 (FIG. 2), e.g., decreasing the maximum allowed number of pending requests in the hardware queue in response to increasing transaction latency, followed by increasing the maximum allowed number of pending requests in the hardware queue after traffic congestion has cleared.

Figure 4:
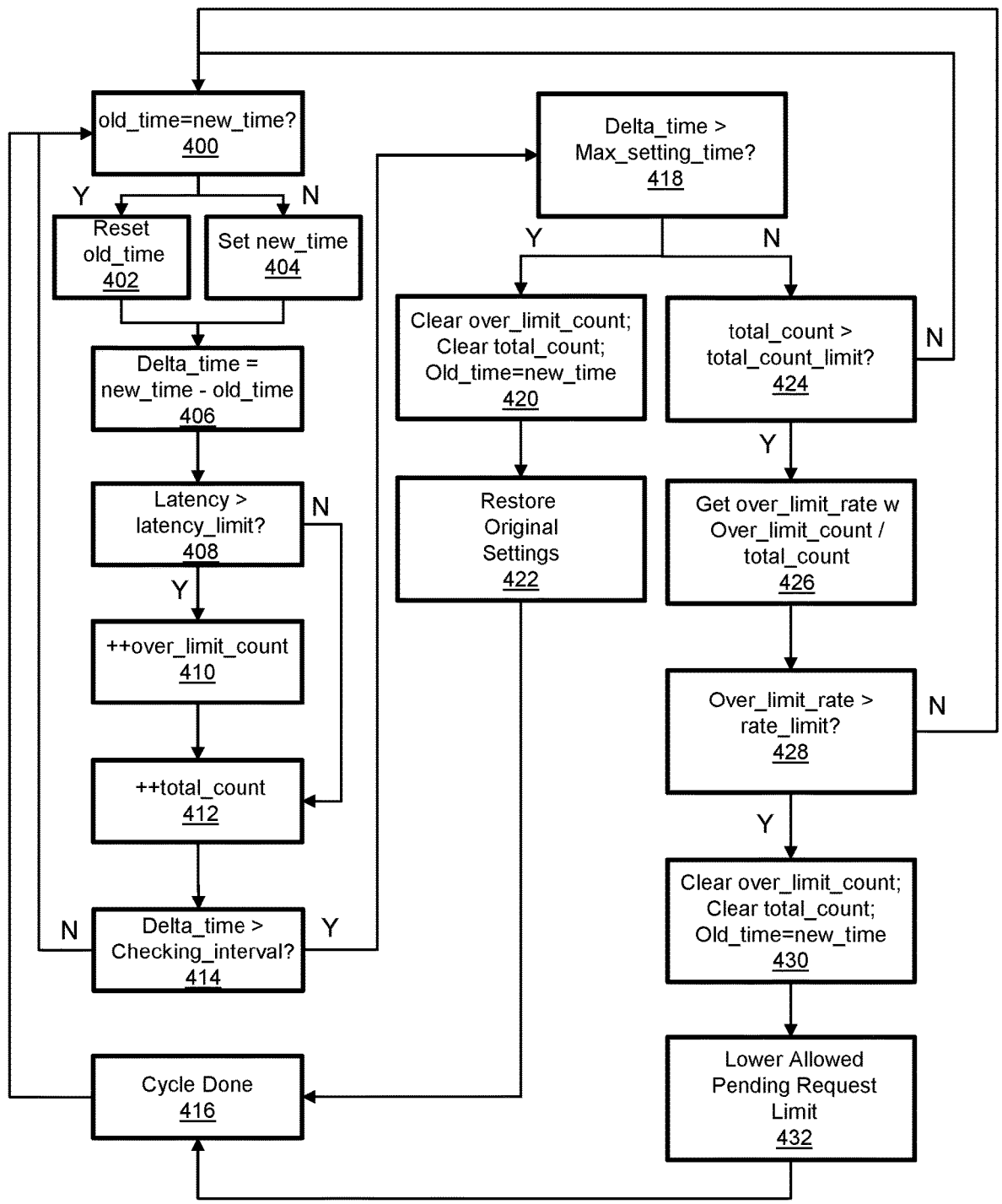
FIG. 4 illustrates an initiator-based NVMEoF flow control process.

FIG. 4 illustrates an initiator-based NVMEoF flow control process. The process may be implemented in parallel for each NVMEoF offload engine. Two counters, old_time and new_time, are used to define flow control cycles, each which may include multiple potential pending request queue limit adjustment cycles, and transaction monitoring cycles. At the start of a flow control cycle the value of old_time=new_time as determined at step 400. Resetting of old_time to begin a new flow control cycle occurs in step 402. Once old_time has been reset for a flow control cycle, new_time is set in each subsequent iteration within the flow control cycle in step 404. Resetting old-time causes new_time and old_time to differ. Delta_time, which is the difference between new_time and old_time, is determined at step 406. Each iteration corresponds to the monitoring of a transaction. If the transaction latency for the monitored transaction is greater than a predetermined transaction latency_limit, as determined in step 408, then an over_limit counter is incremented at step 410. The total transaction count, total_count, is then incremented at step 412. If the transaction latency is not greater than the predetermined latency_limit as determined in step 408, then the total transaction count is incremented at step 412 without incrementing the over_limit count in step 410. A predetermined checking_interval sets the duration of time between potential flow control adjustments. If the delta_time is not greater than the checking_interval as determined at step 414 then the transaction monitoring cycle is not finished, and a new iteration begins by monitoring a new transaction. If the delta_time is greater than the checking_interval as determined at step 414 then step 418 is determining whether the delta_time is greater than the max_setting_time in order to either end the flow control cycle or begin a potential adjustment prior to ending the flow control cycle.

The max_setting_time indicates the duration of a flow control cycle. If delta_time is greater than max_setting_time as determined at step 418 then the flow control cycle is over. The over_limit_count is cleared, the total_count is cleared, and the old_time is set to the new_time at step 420. The original (default) pending request limit, i.e., depth limit of the pending request hardware queue 200 (FIG. 2), is then restored in step 422. Flow then proceeds to step 416, and a new flow control cycle is initialized.

If delta_time is not greater than max_setting_time as determined at step 418 then a potential adjustment cycle commences. If total_count is not greater than a predetermined total_count limit then no adjustment is made and flow proceeds to step 400 to begin a new iteration. If total_count is greater than the predetermined total_count limit then an over_limit rate is calculated in step 426. The over_limit rate=over_limit_count/total_count. If the over_limit rate is not greater than a predetermined rate_limit as determined at step 428 then no adjustment is made and flow proceeds to step 400 to begin a new iteration. If the over_limit rate is greater than the predetermined rate_limit as determined at step 428 then over_limit_count is cleared, total_count is cleared, and old_time is set to new_time at step 430. The pending request limit, i.e., depth limit of the pending request hardware queue 200 (FIG. 2), is then lowered in step 432. Flow then proceeds to step 416, and a new cycle is initialized.

Although no specific advantages are necessarily associated with every implementation, some implementations may help to avoid disruptions associated with exhaustion of memory or processing resources of one or more NVMEoF offload engines. Transaction latency is likely to increase as the IO workload on an NVMEoF offload engine increases beyond some level. This may occur even if the NVME drives remain ready to receive IO commands. By detecting increases in transaction latency and adjusting the depth limit of the pending request hardware queue in response, the transaction workload of an NVMEoF offload engine that is approaching overload conditions may be proactively reduced, thereby avoiding more disruptive events such as dropped transactions.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An internal input-output (TO) flow control method implemented in a storage array with a plurality of non-volatile solid-state drives as first IO end points and a plurality of interconnected compute nodes as second IO end points, wherein the compute nodes access the drives via a fabric and offload engines that are not IO end points and for which utilization of processor and memory resources is not accounted for by any end-to-end remote direct memory access (RDMA) flow control, the offload engines including cache and being configured to perform error correction or deduplication, the method comprising:
   performing end-to-end RDMA flow control between the first IO end points and the second IO end points; and
   performing initiator-based non-volatile memory express over fabric (NVMEoF) flow control by:
      monitoring transactions between ones of the compute nodes and ones of the offload engines to determine transaction latency;
      determining transaction latency as time between send side completion and receive side completion based on messages sent by ones of the offload engines; and
      adjusting a number of pending transactions based on the transaction latency.

2. The method of claim 1 comprising maintaining a count of transactions that exceed a latency limit during a checking interval.

3. The method of claim 2 comprising maintaining a count of monitored transactions during the checking interval.

4. The method of claim 3 comprising resetting both the count of transactions that exceed the latency limit during the checking interval and the count of monitored transactions during the checking interval after a max setting time has elapsed.

5. The method of claim 4 comprising restoring a default limit on the pending transactions after the max setting time has elapsed.

6. The method of claim 5 comprising lowering a limit on pending transactions responsive to a transaction latency over limit rate exceeding a predetermined threshold, wherein the transaction latency over limit rate equals the count of transactions that exceed the latency limit during the checking interval divided by the count of monitored transactions during the checking interval.

7. A non-transitory computer-readable storage medium that stores instructions that when executed by a compute node of a storage array cause the compute node to perform a method for flow control in the storage array where the compute node is a first internal input-output (TO) end point and a plurality of non-volatile solid-state drives are second internal IO end points, wherein the compute nodes access the drives via a fabric and offload engines that are not internal TO end points and for which utilization of processor and memory resources is not accounted for by any end-to-end remote direct memory access (RDMA) flow control, the offload engines including cache and being configured to perform error correction or deduplication, the method comprising:
performing end-to-end RDMA flow control between the first TO end points and the second TO end points; and
performing initiator-based non-volatile memory express over fabric (NVMEoF) flow control by:
monitoring transactions between the compute node and at least one of the offload engines via which the non-volatile drives are accessed to determine transaction latency;
determining transaction latency as time between send side completion and receive side completion based on messages sent by the offload engine; and
adjusting a number of pending transactions based on the transaction latency.

8. The computer-readable storage medium of claim 7 wherein the method comprises maintaining a count of transactions that exceed a latency limit during a checking interval.

9. The computer-readable storage medium of claim 8 wherein the method comprises maintaining a count of monitored transactions during the checking interval.

10. The computer-readable storage medium of claim 9 wherein the method comprises resetting both the count of transactions that exceed the latency limit during the checking interval and the count of monitored transactions during the checking interval after a max setting time has elapsed.

11. The computer-readable storage medium of claim 10 wherein the method comprises restoring a default limit on the pending transactions after the max setting time has elapsed.

12. The computer-readable storage medium of claim 11 wherein the method comprises lowering a limit on pending transactions responsive to a transaction latency over limit rate exceeding a predetermined threshold, wherein the transaction latency over limit rate equals the count of transactions that exceed the latency limit during the checking interval divided by the count of monitored transactions during the checking interval.

13. An apparatus comprising:
a plurality of non-volatile solid-state drives that are first internal input-output (TO) end points;
a plurality of interconnected compute nodes that are second internal TO end points, end-to- end remote direct memory access (RDMA) flow control being implemented between the first TO end points and the second TO end points, the plurality of interconnected compute nodes configured to access the drives via a fabric and ones of a plurality of offload engines that are not internal TO end points and for which utilization of processor and memory resources is not accounted for by any end-to-end remote direct memory access (RDMA) flow control, the offload engines including cache and being configured to perform error correction or deduplication; and
an initiator-based non-volatile memory express over fabric (NVMEoF) flow controller configured to monitor transactions between ones of the compute nodes and ones of the offload engines to determine transaction latency and adjust a number of pending transactions based on the transaction latency, wherein transaction latency indicates time between send side completion and receive side completion based on messages sent by ones of the offload engines.

14. The apparatus if claim 13 wherein the flow controller is configured to maintain a count of transactions that exceed a latency limit during a checking interval.

15. The apparatus if claim 14 wherein the flow controller is configured to maintain a count of monitored transactions during the checking interval.

16. The apparatus if claim 15 wherein the flow controller is configured to reset both the count of transactions that exceed the latency limit during the checking interval and the count of monitored transactions during the checking interval after a max setting time has elapsed.

17. The apparatus if claim 16 wherein the flow controller is configured to restore a default limit on the pending transactions after the max setting time has elapsed.

18. The apparatus if claim 17 wherein the flow controller is configured to lower a limit on pending transactions responsive to a transaction latency over limit rate exceeding a predetermined threshold, wherein the transaction latency over limit rate equals the count of transactions that exceed the latency limit during the checking interval divided by the count of monitored transactions during the checking interval.

* * * * *